United States Patent
Sato et al.

(10) Patent No.: US 12,510,190 B2
(45) Date of Patent: Dec. 30, 2025

(54) PINCH VALVE

(71) Applicant: ASAHI YUKIZAI CORPORATION, Nobeoka (JP)

(72) Inventors: Yukinobu Sato, Nobeoka (JP); Kenji Kuroda, Nobeoka (JP)

(73) Assignee: ASAHI YUKIZAI CORPORATION, Miyazaki (JP)

( * ) Notice: Subject to any disclaimer, the term of this patent is extended or adjusted under 35 U.S.C. 154(b) by 5 days.

(21) Appl. No.: 17/913,052

(22) PCT Filed: Mar. 9, 2021

(86) PCT No.: PCT/JP2021/009245
§ 371 (c)(1),
(2) Date: Sep. 20, 2022

(87) PCT Pub. No.: WO2021/193011
PCT Pub. Date: Sep. 30, 2021

(65) Prior Publication Data
US 2023/0213125 A1    Jul. 6, 2023

(30) Foreign Application Priority Data
Mar. 26, 2020    (JP) .................................. 2020-056048

(51) Int. Cl.
*F16K 7/04*    (2006.01)
*F16L 11/12*    (2006.01)

(52) U.S. Cl.
CPC .............. *F16L 11/122* (2013.01); *F16K 7/04* (2013.01)

(58) Field of Classification Search
CPC .. F16L 11/122; F16K 7/04; F16K 7/07; F16K 37/0008; F16K 7/02; F16K 7/06;
(Continued)

(56) References Cited

U.S. PATENT DOCUMENTS

| | | | | | |
|---|---|---|---|---|---|
| 2,979,931 | A | * | 4/1961 | Hubbard | D06F 39/02 68/17 R |
| 3,197,173 | A | * | 7/1965 | Taubenheim | F16K 7/06 24/527 |

(Continued)

FOREIGN PATENT DOCUMENTS

| | | |
|---|---|---|
| CN | 2301584 Y | 12/1998 |
| JP | S57-000194 U1 | 1/1982 |

(Continued)

OTHER PUBLICATIONS

International Search Report for PCT/JP2021/009245 (May 18, 2021).

*Primary Examiner* — Craig M Schneider
*Assistant Examiner* — Andrew J Rost
(74) *Attorney, Agent, or Firm* — Merchant & Gould P.C.

(57) ABSTRACT

A pinch valve 1 comprises a tube body 3 made of an elastic material having a flow path formed inside, a pressing part 4, a rod member 6 attached to a front end of the pressing part 4, and a coupling part 35 provided on the outer surface of the tube body 3 and coupling the rod member 6 to the tube body 3 in a transverse arrangement with respect to the tube body 3, wherein pressing or releasing the tube body 3 by the pressing part 4 through the rod member 6 makes the tube body 3 deform and opens or closes the flow path.

3 Claims, 8 Drawing Sheets

(58) Field of Classification Search
CPC .......... F16K 7/061; F16K 7/063; F16K 7/065; F16K 7/066
USPC .......................................................... 251/7
See application file for complete search history.

(56) References Cited

U.S. PATENT DOCUMENTS

| | | | | |
|---|---|---|---|---|
| 3,491,983 | A * | 1/1970 | Van Damme | F16K 7/06 251/5 |
| 3,498,316 | A * | 3/1970 | Humphrey | F16K 7/06 251/7 |
| 3,734,133 | A * | 5/1973 | Little | F16K 31/046 251/6 |
| 3,744,524 | A * | 7/1973 | Blau | F16K 7/06 251/6 |
| 4,322,054 | A * | 3/1982 | Campbell | F16K 7/061 251/5 |
| 4,326,695 | A | 4/1982 | Lincoln | |
| 5,004,210 | A | 4/1991 | Sarno | |
| 8,567,751 | B2 | 10/2013 | Rozy et al. | |
| 9,400,058 | B2 * | 7/2016 | Nikkinen | F16K 7/04 |
| 2002/0070366 | A1 * | 6/2002 | Hafner | F16K 7/06 251/4 |
| 2012/0032098 | A1 * | 2/2012 | Rozy | F16K 7/06 251/7 |
| 2014/0299798 | A1 * | 10/2014 | Opfer | F16K 7/06 251/5 |
| 2014/0339447 | A1 * | 11/2014 | Nikkinen | F16K 7/06 251/7 |
| 2020/0056709 | A1 * | 2/2020 | Loprete | F16K 7/04 |
| 2020/0370663 | A1 | 11/2020 | Regen et al. | |
| 2021/0215260 | A1 | 7/2021 | Sato et al. | |

FOREIGN PATENT DOCUMENTS

| | | |
|---|---|---|
| JP | 2019-211081 A | 12/2019 |
| WO | 2019/034772 A1 | 2/2019 |

* cited by examiner (a)

(b)

PINCH VALVE

This application is a National Stage Application of PCT/JP2021/009245, filed Mar. 9, 2021, which claims benefit of priority to Application No. 2020-056048, filed Mar. 26, 2020, in Japan, and which applications are incorporated herein by reference. To the extent appropriate, a claim of priority is made to each of the above disclosed applications.

FIELD

The present invention relates to a pinch valve.

BACKGROUND

Known in the art is a pinch valve comprising a valve part, a tube body which has a flow path formed inside and is accommodated in the valve part, a pressing part for pressing or releasing the tube body to thereby make the tube body elastically deform and open or close the flow path, and a driving part for driving the pressing part (for example, see PTL 1). In the pinch valve of PTL 1, the tube body is accommodated inside a holding member in the valve part. At each of the two ends of the tube body, an annular flange part is formed. Generally, the tube body is formed from rubber or another elastic material.

CITATION LIST

Patent Literature

[PTL 1] Japanese Unexamined Patent Publication No. 2019-211081

SUMMARY

Technical Problem

The tube body is repeatedly pressed and released by the pressing part over many years. Due to this, the material forming the tube body ends up deteriorating. If the material deteriorates, even when released after full closure by pressing by the pressing part, sometimes the inner surfaces of the tube body that contact each other at the time of full closure will stick to each other or the shape of the tube body will not be sufficiently restored or the tube body will end up plastically deforming. As a result, there is a possibility of problems arising such as the pinch valve not being sufficiently opened or closed and response being reduced.

An object of the present invention is to provide a pinch valve for which opening and closing can be reliably controlled.

Solution to Problem

According to one aspect of the present invention, there is provided a pinch valve comprising a tube body made of an elastic material having a flow path formed inside, a pressing part, a rod member attached to a front end of the pressing part, and a coupling part provided on the outer surface of the tube body and coupling the rod member to the tube body in a transverse arrangement with respect to the tube body, wherein pressing or releasing the tube body by the pressing part through the rod member makes the tube body deform and opens or closes the flow path.

The rod member may be a cylindrically shaped member, and the front end of the pressing part may be provided with a fitting recessed part into which the rod member can be snap fit. The fitting recessed part may be provided with a latch tab which can latch onto the rod member. The rod member may be formed to a length the same as the width of the tube body after deformation when the pinch valve is fully closed.

Advantageous Effects of Invention

According to the embodiments of the present invention, the common effect of providing a pinch valve for which opening and closing can be reliably controlled is exhibited.

DESCRIPTION OF EMBODIMENTS

Figure 1:
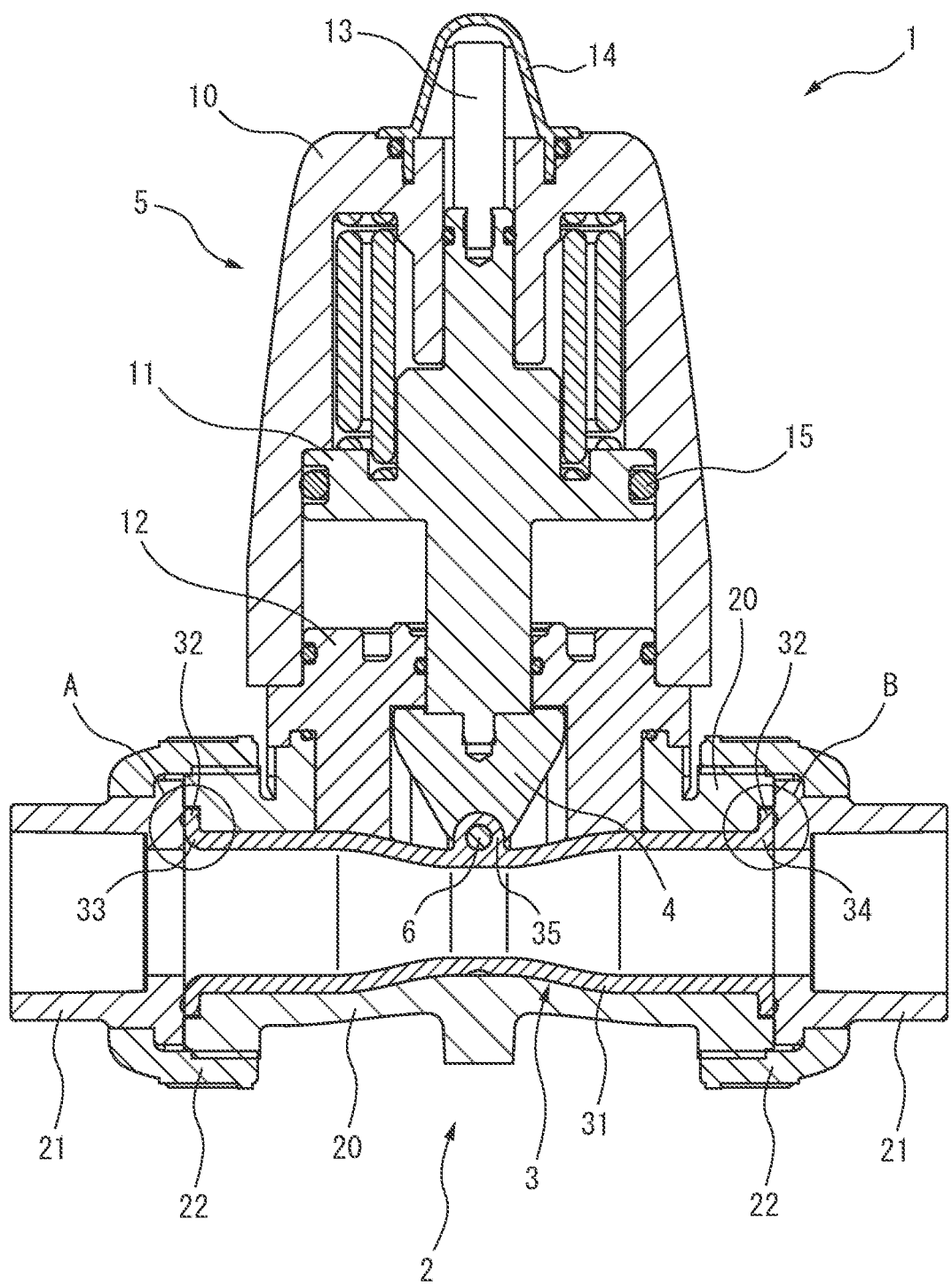
FIG. 1 is a vertical cross-sectional view of a pinch valve according to an embodiment of the present invention.

Below, referring to the drawings, embodiments of the present invention will be explained in detail. Note that, in all of the drawings, similar component elements will be assigned the same reference notations.

FIG. 1 is a vertical cross-sectional view of a pinch valve 1 according to an embodiment of the present invention. The pinch valve 1 comprises a valve part 2, tube body 3 (tube) which has a flow path formed inside and is accommodated in the valve part 2, a pressing part 4 for pressing or releasing the tube body 3 to make the tube body 3 elastically deform and open or close the flow path, a driving part 5 for driving the pressing part 4, and a cylindrically shaped rod member 6 attached to a front end of the pressing part 4.

The driving part 5 comprises a cylinder 10, a piston 11 which can slide inside the cylinder 10, a base plate 12 disposed facing the piston 11, an indicator 13, and a cap 14. The driving part 5 is an air actuator and can supply compressed air from a not shown air inlet into the cylinder 10 or expel it from the cylinder 10 to make the piston 11 and pressing part 4 rise and fall inside the cylinder 10. The driving part 5 may also be an electric actuator or may be a part making the pressing part 4 rise or fall by manual operation of a handle or a lever. The pressing part 4 is attached to the front end of the piston 11. The indicator 13 set on top of the piston 11 emerges from or retracts into the cylinder 10 with raising or lowering of the piston 11. Accordingly, by viewing the state of emergence of the indicator 13 through the cap 14, it is possible to ascertain the position of the piston 11 and in turn the position of the pressing part 4, that is, the opening/closing state of the pinch valve 1. The pinch valve 1 has a plurality of O-rings (for example, O-ring 15) for sealing the members.

The valve part 2 comprises a tubular holding member 20 which is formed as a single piece and can accommodate the tube body 3, connecting members 21 disposed at the two ends of the bolding member 20, and cap nuts 22 which are screwed with the connecting members 21 and two ends of the holding member 20. The driving part 5 is attached by a not shown screw to the valve part 2, specifically, the holding member 20. The tube body 3 has a cylindrically shaped tube main body 31 and annular flange parts 32 provided on the two ends of the tube main body 31. A flow path is formed inside the tube body 3. The cap nuts 22 are screwed with the holding member 20 in the state with the connecting members 21 closely contacting the end faces of the flange parts 32 and the end faces of the holding member 20.

The pinch valve 1, in particular, the valve part 2, can be formed from a plastic material overall. For example, the cylinder 10 and base plate 12 are formed from glass fiber reinforced polypropylene (PPG), the pressing part 4 and piston 11 are formed from polyacetal (POM), the holding member 20, connecting members 21, and cap nuts 22 are formed from polyvinyl chloride (U-PVC), the indicator 13 is formed from acrylonitrile-butadiene styrene (ABS), and the cap 14 is formed from polycarbonate (PC). The tube body 3 is constituted by rubber or other elastic material and is, for example, formed from ethylene-propylene-diene rubber (EPDM) or fluoro rubber (FKM). The rod member 6 is constituted by a metal material or hard plastic and may use the same material as the pressing part 4.

Figure 2:
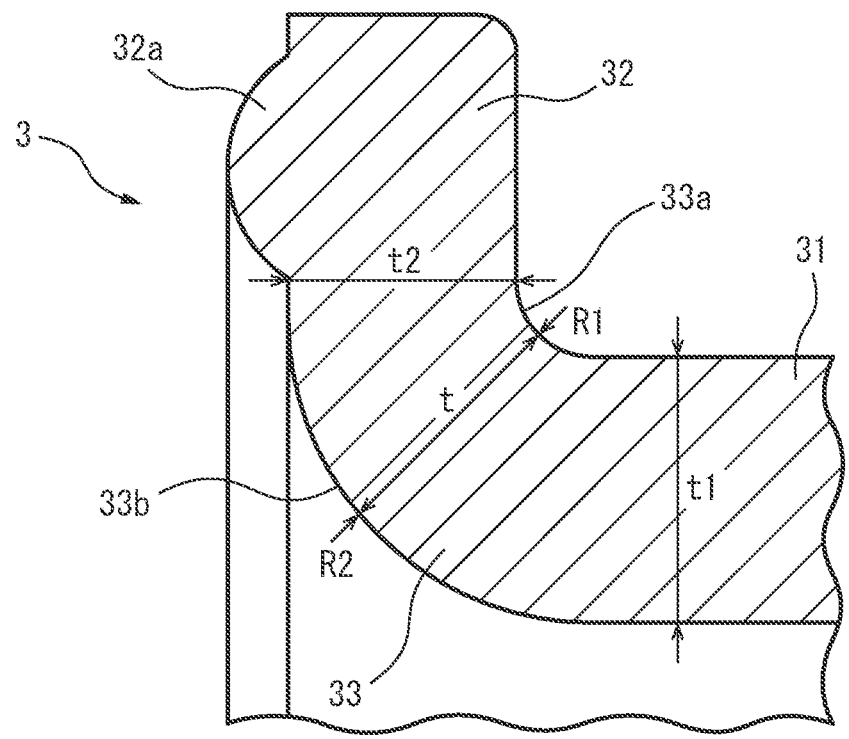
FIG. 2A and FIG. 2B are vertical cross-sectional views of an enlarged portion of the tube body.
Figure 2:
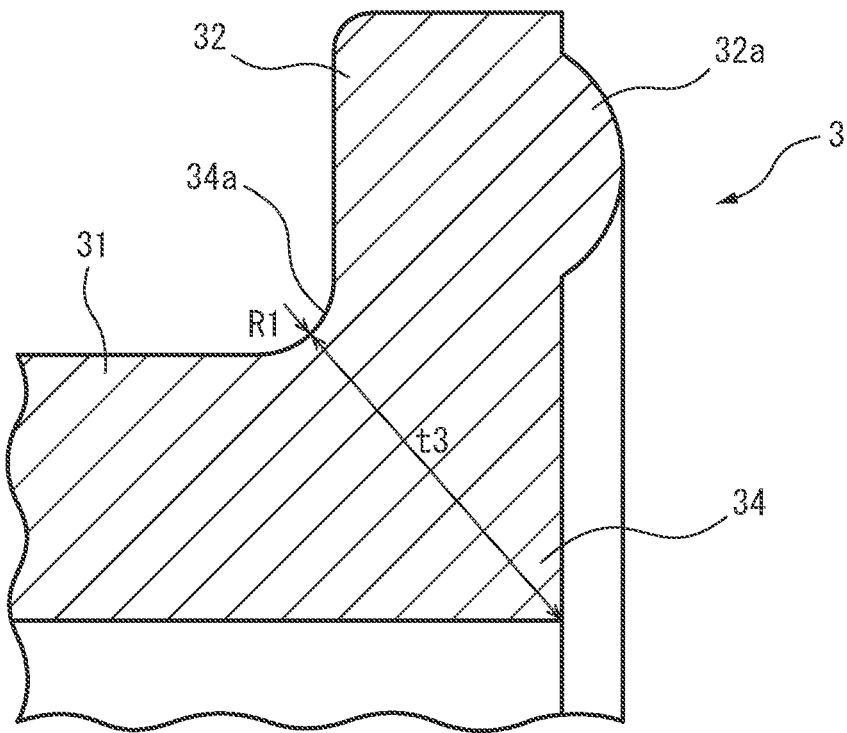

FIG. 2A and FIG. 2B are vertical cross-sectional views of an enlarged portion of the tube body 3. Specifically, FIG. 2A is an enlarged view of section A shown in FIG. 1, and FIG. 2B is an enlarged view of part B shown in FIG. 1.

Referring to FIG. 2A, in the tube body 3, at least one of the flange parts 32, in the present embodiment, the flange part 32 at the left side in FIG. 1, is configured to protrude radially outward at an end part of the tube main body 31 through a curved part 33. An end face of the flange part 32 facing outward in the axial direction is provided with an annular sealing projection 32a which tightly contacts a connecting member 21 to exhibit a sealing effect.

At the curved part 33, a first curved surface part 33a is provided at the outside of the tube body 3, that is, at the outside of the flow path, and a second curved surface part 33b is provided at the inside of the tube body 3, that is, at the inside of the flow path. In the vertical cross-sectional views shown in FIG. 2A and FIG. 2B, that is, the cross-sections taken along the center axis of the tube body 3, the radius of curvature R1 at the first curved surface part 33a is formed smaller than the radius of curvature R2 at the second curved surface part 33b. If the first curved surface part 33a and second curved surface part 33b are constituted by pluralities of curved surfaces having pluralities of radii of curvature, the largest radii of curvature may be compared. That is, the largest radius of curvature of the first curved surface part 33a may be formed smaller than the largest radius of curvature of the second curved surface part 33b.

In the vicinity of the curved part 33, the thickness t1 of the tube main body 31 may be formed larger than the thickness t2 of the flange part 32. In this case, the radial thickness "1" of the curved part 33 is formed so as to continuously decrease from the tube main body 31 side toward the flange part 32 side. Therefore, the radial thickness "t" of the curved part 33 is smaller than the thickness t1 of the tube main body 31 and larger than the thickness (2 of the flange part 32. Here, the radial thickness "t" of the curved part 33 is defined to be the thickness of the first curved surface part 33a or second curved surface part 33b at a predetermined position in a direction perpendicular to the tangent.

Referring to FIG. 2B, the other of the flange parts 32 is configured to protrude radially outward at an end part of the tube main body 31 through a edge part 34. At the edge part 34, at the outside of the tube body 3, like the curved part 33, a curved surface part 34a having a radius of curvature R1 and corresponding to the first curved surface part 33a is provided. On the other band, at the inside of the tube body 3, a curved surface part corresponding to the second curved surface part 33b is not provided. Strictly speaking, there is a portion with a minute radius of curvature at the inside of the tube body 3, but this radius of curvature is extremely small compared to the radius of curvature R1 of the curved surface part 34a. Further, the largest thickness t3 of the curved surface part 34a at a predetermined position in a direction perpendicular to the tangent is extremely large even when compared against the thickness t1 of the tube main body 31 and the thickness 12 of the flange part 32.

If comparing the curved part 33 shown in FIG. 2A and the edge part 34 shown in FIG. 2B, as clear from the shapes and structures as well, the curved part 33 is less rigid than the edge part 34, therefore, the flange part 32 is readily bendable in, for example, the axial direction about the curved part 33. Therefore, the one end part of the tube body 3 where the curved part 33 is provided elastically deforms more readily compared to the other end part of the tube body 3 where the edge part 34 is provided. Furthermore, as explained earlier, by making the thickness 12 of the flange part 32 smaller than the thickness t1 of the tube main body 31, it is possible to make the flange part 32 more easily elastically deform.

If the holding member 20 is formed as a single piece like in the pinch valve 1 according to the present embodiment, to accommodate the tube body 3 in the holding member 20, it is necessary to make one end part of the tube body 3 elastically deform while inserting it inside the holding member 20. Accordingly, at the time of assembly, by making the end part of the tube body 3 where the curved part 33 is provided deform by being compressed radially inwardly, it is possible to easily insert the tube body 3 inside the holding member 20. As a result, it is possible to easily attach the tube body 3 provided with the flange parts 32 to the holding member 20. Further, the first curved surface part 33a and second curved surface part 33b are provided at the curved parts 33, so the stress at the time of elastic deformation is dispersed and damage to the curved part 33 and around the curved part 33 due to stress concentration is prevented etc.

Note that the edge part 34 has high rigidity, so it is difficult to make the flange part 32 bend in, for example, the axial direction about the edge part 34 and, accordingly, it is difficult to make the end part of the tube body 3 where the edge part 34 is provided elastically deform. For this reason, it is difficult to make the end part of the tube body 3 where the edge part 34 is provided elastically deform while inserting the tube body 3 inside the holding member 20. If unreasonably trying to deform it, there is a possibility that the tube body would be damaged and the seal would be compromised.

Therefore, if there is a possibility of assembly by inserting either of the end parts of the tube body 3 inside the holding member 20, it is also possible to configure the valve so as to provide curved parts 33 at both of the flange parts 32 of the tube body 3. By doing so, it is possible to ensure that assembly can be performed quickly and reliably without it being necessary to check the end parts at the time of assembly. Note that by providing a curved part 33 only at one of the end parts of the tube body 3 like in the embodiment explained above, it is possible to inexpensively fabricate the mold for manufacturing the tube body 3 in comparison to when providing curved parts 33 at both end parts of the tube body 3. That is, the core of the flow path side of the tube body 3 would be constituted by two core halves divided at the center of the flow path along a plane orthogonal to the center axis. At this time, the surface of the second curved surface part 33b, the surface of the tube main body 31, and the surfaces of the flange parts 32 are continuous, so while not posing any functional problems, the presence of an insert parting line would end up being conspicuous. To make the outer appearance more beautiful, the core half where the curved part 33 is provided is fabricated as a single piece using a large mold material. On the other hand, the edge part 34 is substantially right angled, so the insert parting line would not be conspicuous if it were provided at the front end of the edge part 34. Therefore, the core half where the curved part 33 is not provided can be fabricated in a split manner so that the insert parting line is located on the portion corresponding to the edge part 34. For this reason, the core half where the curved part 33 is not provided can be fabricated more cheaply than the core half where the curved part 33 is provided. The constitution of the tube body 3 provided with the curved part 33 in the manner explained earlier for the flange part 32 may be applied to valves other than a pinch valve that have similar constitutions, for example, butterfly valves and other such valves.

Figure 3:
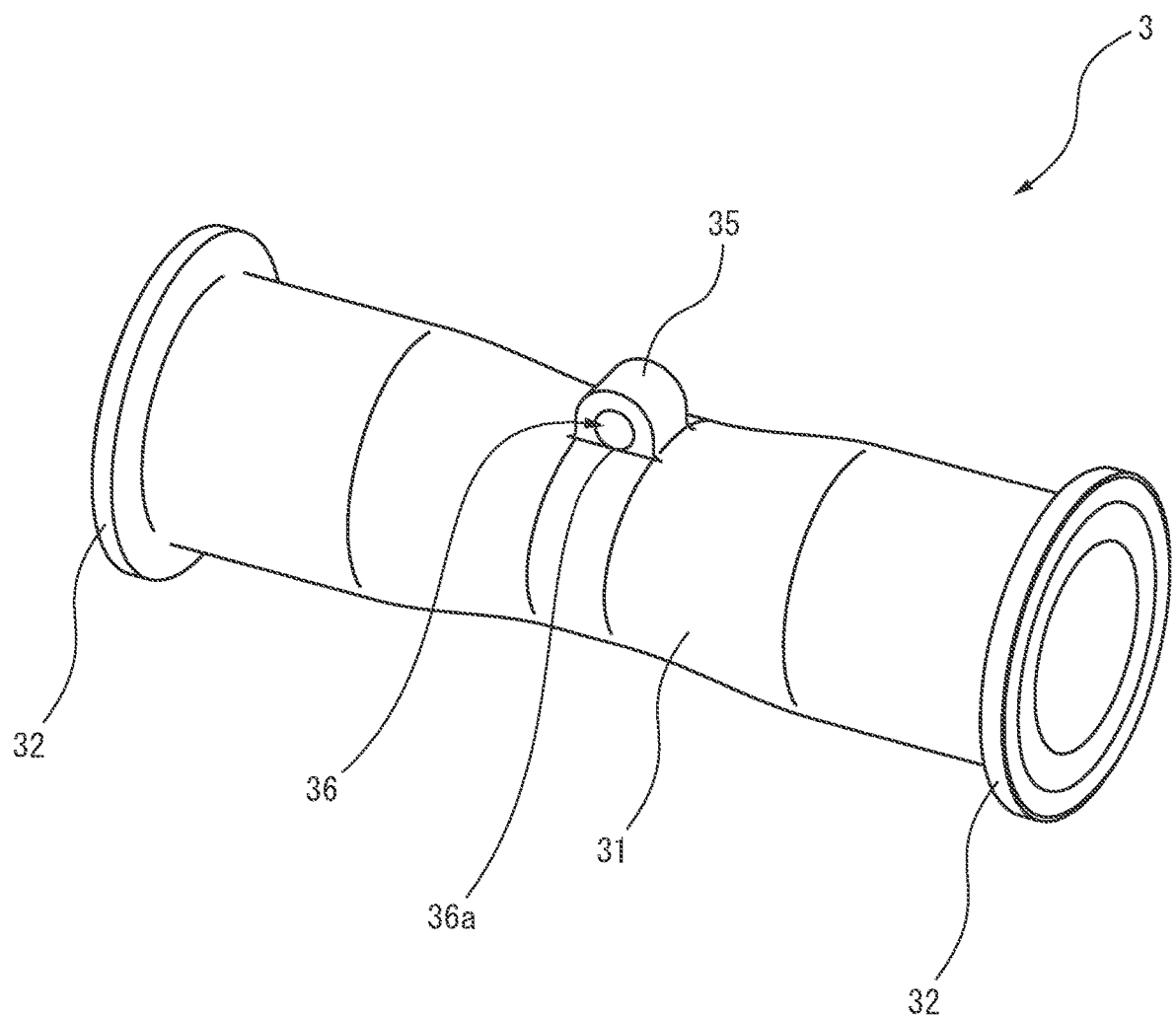
FIG. 3 is a perspective view of the tube body.
Figure 4:
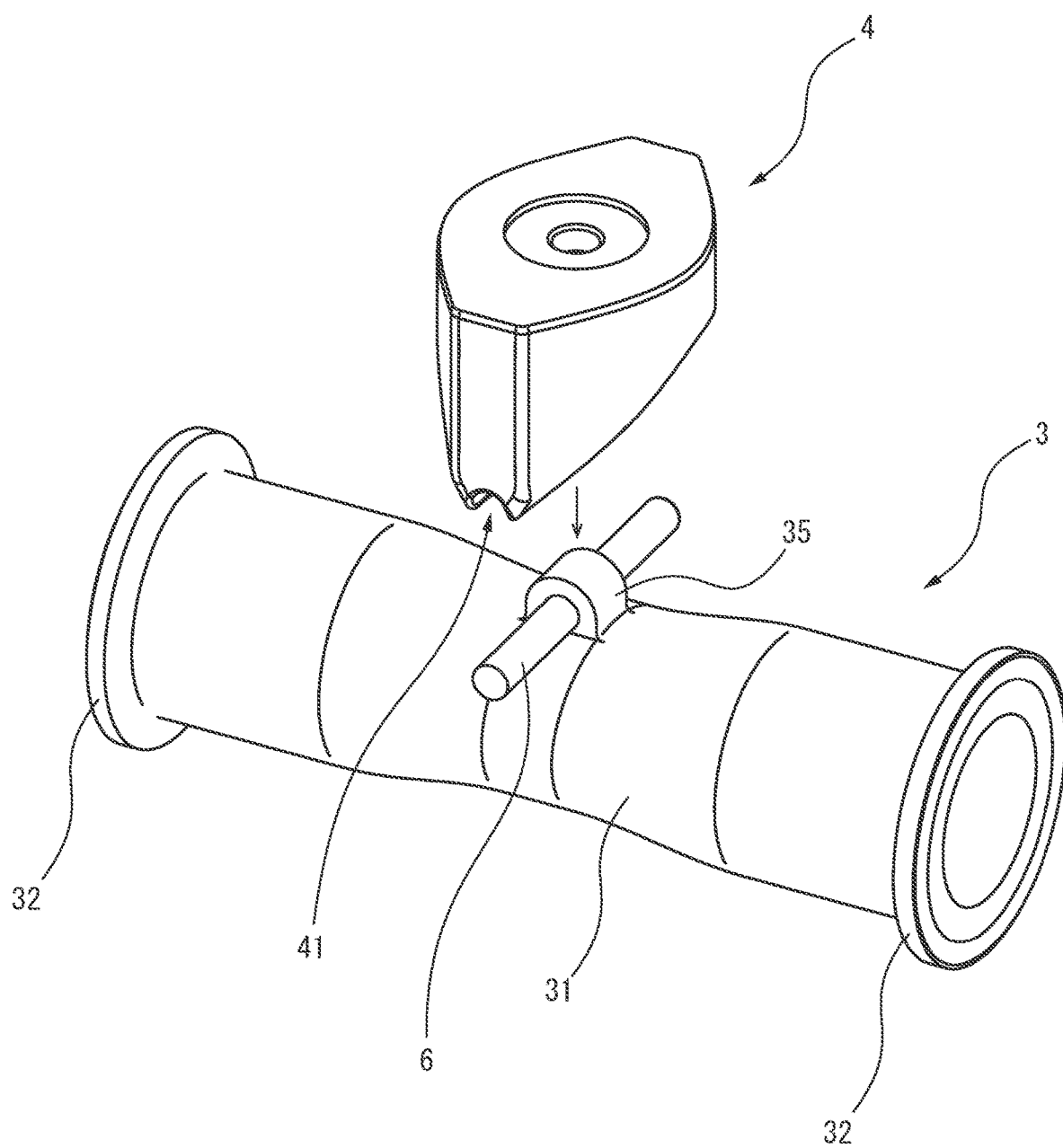
FIG. 4 is a perspective view showing assembly of the tube body and a pressing part.

FIG. 3 is a perspective view of the tube body 3. FIG. 4 is a perspective view showing assembly of the tube body 3 and the pressing part 4. The tube body 3 further has a coupling part 35 which is provided on the outer surface of the tube body 3, that is, the outer surface of the tube main body 31, and couples the rod member 6 to the tube body 3 in a transverse arrangement with respect to the tube body 3. In other words, the coupling part 35 is provided with a through hole 36 which extends transversely relative to the tube body 3 and through which the rod member 6 can be inserted. The coupling part 35 is formed in a cylindrical shape overall but can be formed in any shape as long as a through hole 36 is provided. The coupling part 35 is provided as a single piece with the tube main body 31.

To assemble the tube body 3 and pressing part 4 of the valve part 2, as explained above, the tube body 3 is made to elastically deform while accommodating it inside the holding member 20. Next, the rod member 6 is inserted inside the through hole 36 of the coupling part 35. Next, the rod member 6 is attached to the front end of the pressing part 4 whereby assembly of the tube body 3 and the pressing part 4 is completed.

Figure 5:
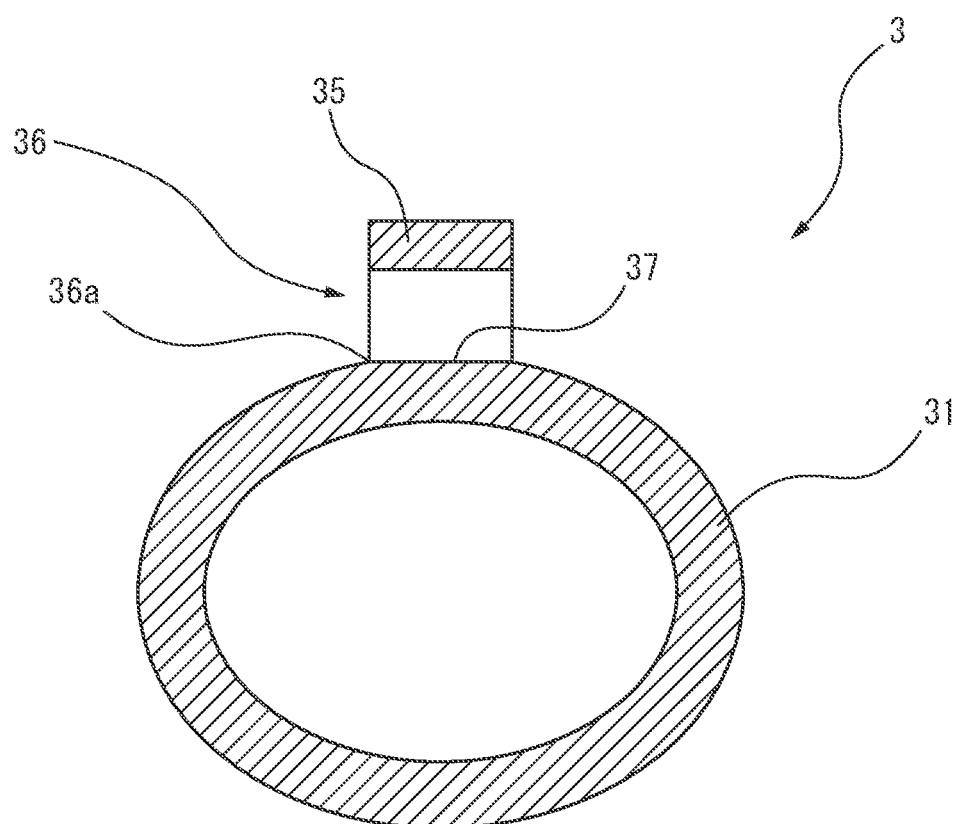
FIG. 5 is a transverse cross-sectional view of the tube body.

FIG. 5 is a transverse cross-sectional view of the tube body 3. The inner surface of the through hole 36 of the coupling part 35 is formed in a substantially cylindrical shape matching the cylindrical rod member 6. A flat surface 37 extending the entire length of the through hole 36 is provided on the inner surface of the through hole 36 on the side near the tube main body 31. By the flat surface 37 being provided, the step difference between an entrance part 36a of the through hole 36 and the outer surface of the tube main body 31 can be eliminated. As a result, it is possible to smoothly insert the rod member 6 inside the through hole 36 at the time of assembly.

Figure 6:
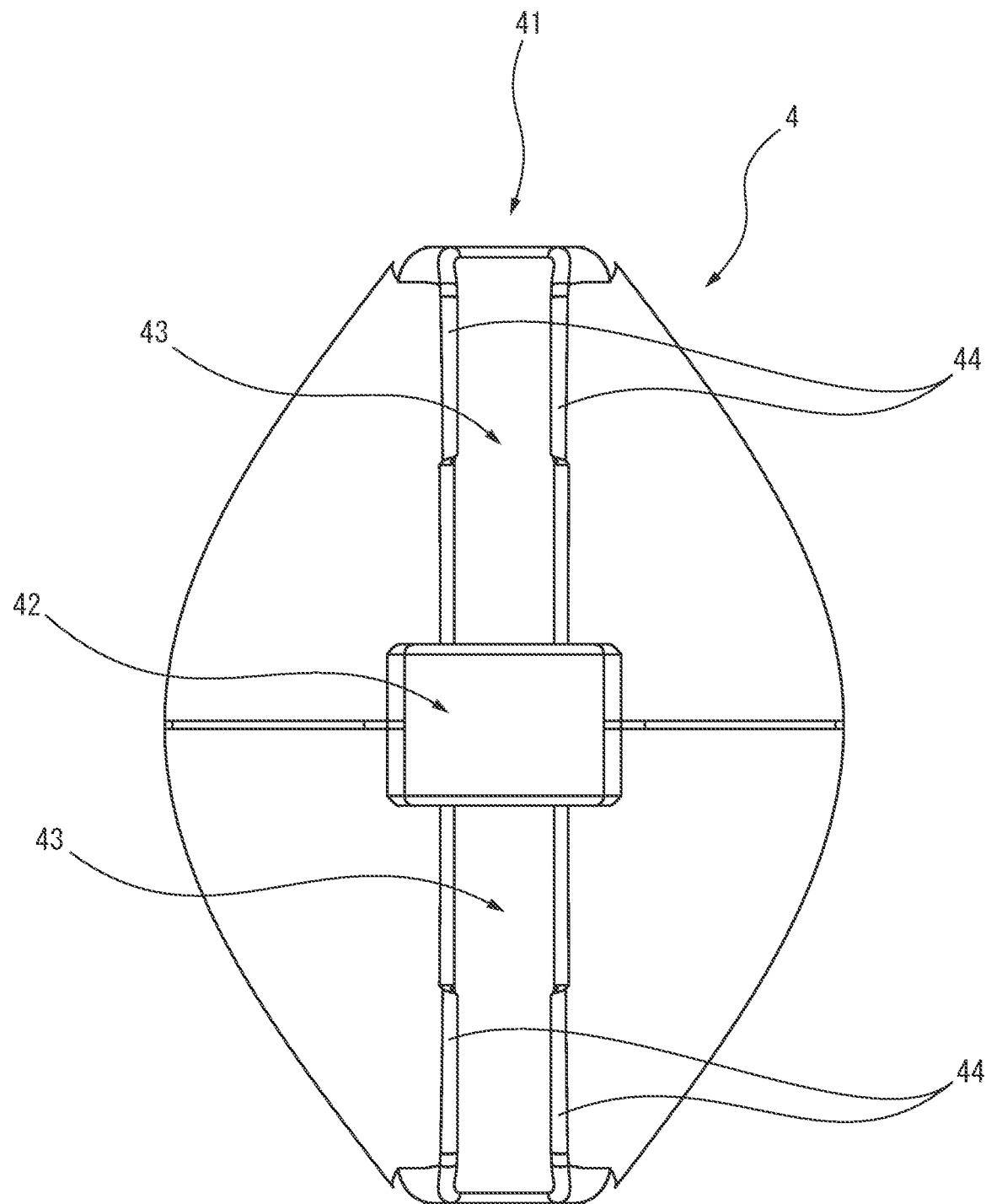
FIG. 6 is a front view of the pressing part.
Figure 7:
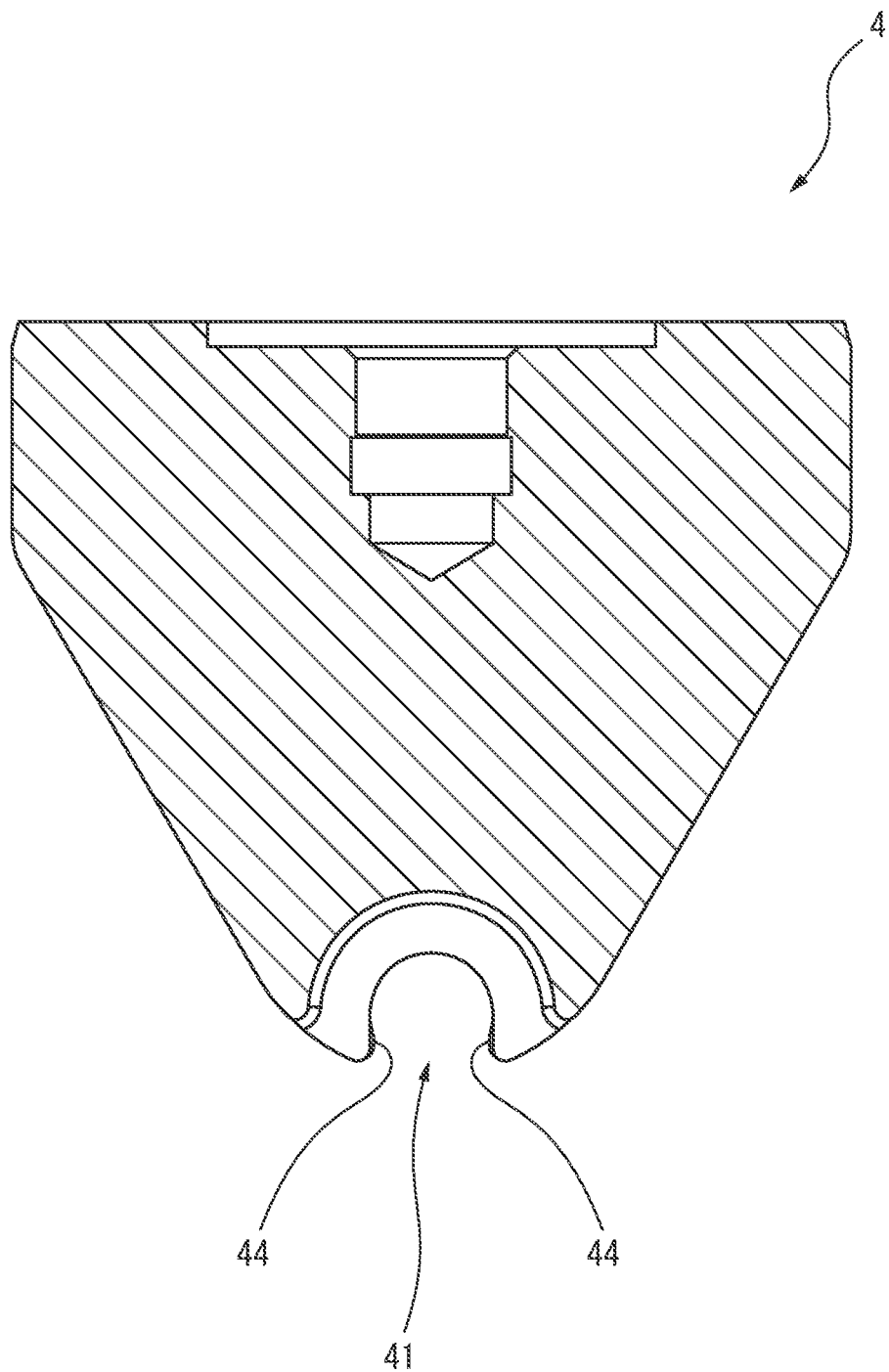
FIG. 7 is a transverse cross-sectional view of the pressing part.

FIG. 6 is a front view of the pressing part 4, and FIG. 7 is a transverse cross-sectional view of the pressing part 4. The front end of the pressing part 4 is provided with a fitting recessed part 41 onto which the rod member 6 can be snap fit. The fitting recessed part 41 comprises a first recessed part 42 formed in a complementary manner to receive the coupling part 35 and a second recessed part 43 which extends from both sides of the first recessed part 42 on the same line and is formed in a complementary manner to receive the rod member 6. A pair of latch tabs 44 which can latch on the rod member 6 are provided only at the two end parts of the second recessed part 43.

The pair of latch tabs 44 are provided along the rim part of the second recessed part 43. The interval between the pair of latch tabs 44 is smaller than the diameter of the cylindrical rod member 6. On the other hand, the interval between the parts of the rim part of the second recessed part 43 where the latch tabs 44 are not provided is larger than the diameter of the cylindrical rod member 6. When the pressing part 4 is pressed onto the cylindrically shaped rod member 6 at the time of assembly, it is possible to make the pair of latch tabs 44 elastically deform by the rod member 6 so that the pair of latch tabs 44 separate from each other at the second recessed part 43 and enable the rod member 6 to be snap fit. As a result, the pressing part 4, rod member 6, and the tube body 3 to which the rod member 6 is coupled can be simply and strongly coupled as a single piece.

Figure 8:
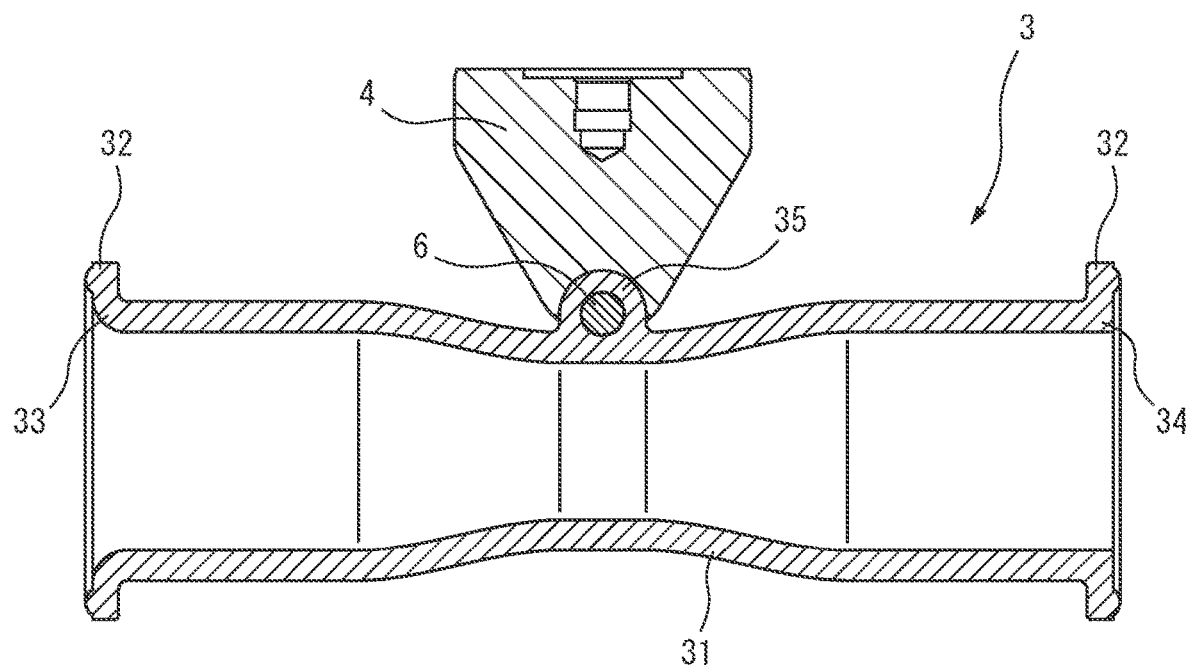
FIG. 8A and FIG. 8B are vertical cross-sectional views showing opening and closing of the flow path in the tube body.
Figure 8:
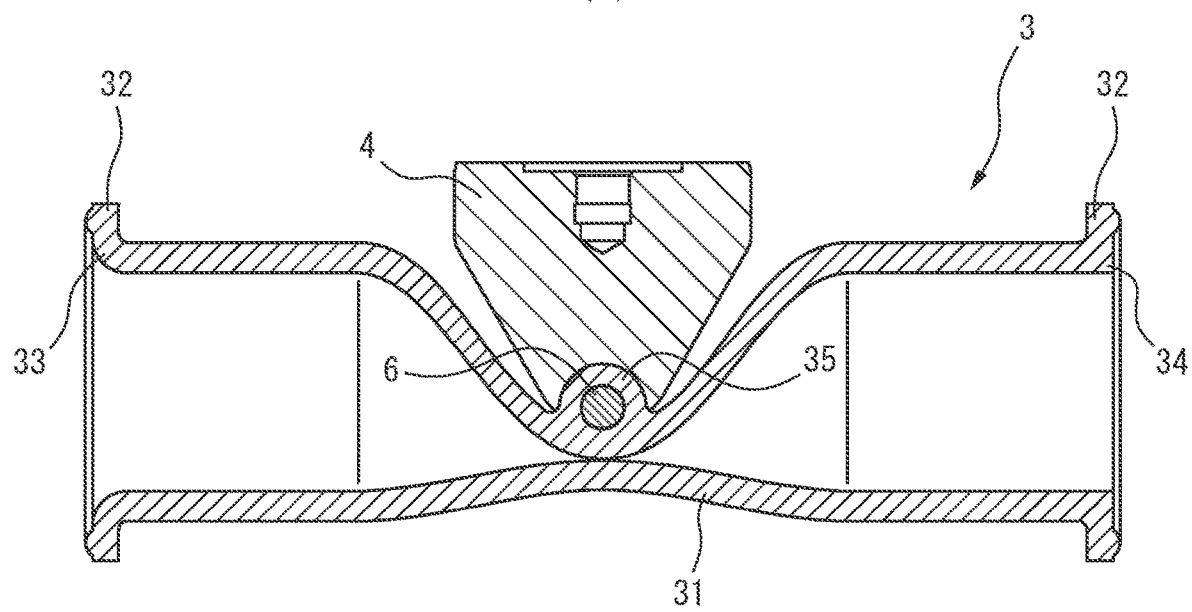

FIG. 8A and FIG. 8B are vertical cross-sectional views showing opening and closing of the flow path in the tube body 3. FIG. 8A shows the fully opened state of the pinch valve 1, while FIG. 8B shows the fully closed state of the pinch valve 1. In FIG. 8A and FIG. 8B, the pinch valve 1 parts other than the tube body 3, pressing part 4, and rod member 6 are omitted. The pinch valve 1 is configured to that by pressing or releasing the tube body 3 by the pressing part 4 through the rod member 6, the tube body 3 is made to deform and the flow path is made to open or close.

The pressing part 4 is coupled to the tube body 3 through the rod member 6, so when the tube body 3 is pressed by the pressing part 4, the tube body 3 is pressed by the entire rod member 6 in the length direction. At this time, no load acts on the coupling part 35. On the other hand, when the tube body 3 is released by the pressing part 4, for example, when the piston 11 is made to rise, the pressing part 4 rises and the rod member 6 fit to the pressing part 4 pulls up the tube main body 31 through the coupling part 35. As a result, the pinch valve 1 can be reliably made a fully opened state. In other words, the shape, arrangement, and size of the latch tabs 44 are suitably designed so that a fitting force of an extent by which the rod member 6 will not be dislodged can be obtained when lifting up the tube main body 31 to place the pinch valve 1 in a fully opened state. The conditions of use of the pinch valve 1, fluid pressure, the material of the tube body 3, etc. may be taken into account in the design of the latch tabs 44.

Accordingly, even if the rubber or other elastic material forming the tube body 3 deteriorates over time and leads to a reduction in the elastic restoring force of the tube body 3, plastic deformation of the tube body 3, or sticking of the inner faces of the tube body 3 contacting each other at the time of full closure, it is possible to reliably and precisely control opening and closing of the pinch valve 1. Further, there is no load acting on the coupling part 35 when the tube body 3 is pressed by the pressing part 4. It is only at the time of release that there is a load acting in the tensile direction when the tube body 3 is being pulled up. Therefore, it is possible to keep deterioration of or damage to the coupling part 35 to a minimum. Furthermore, the pinch valve 1 is configured with a rod member 6 and coupling part 35 added in comparison to the pinch valve disclosed in PTL 1, but reliable opening and closing can be realized without changing the overall size of the pinch valve much at all.

The rod member 6 preferably is made substantially the same length as the width of the tube body 3 after deformation in the fully closed state. If the rod member 6 is shorter than the width of the tube body 3 after deformation in the fully closed state, the rim parts of the two end parts of the rod member 6 will contact the surface of the tube main body 31 and may end up damaging the tube body 3. On the other hand, if the rod member 6 is longer than the width of the tube body 3 after deformation in the fully closed state, it may interfere with the inner surface of the holding member 20 or other parts. Note that from the viewpoint of preventing damage to the tube body 3 by the rod member 6 in the event that there is contact with the tube main body 31, the rim parts of the end parts of the rod member 6 are preferably chamfered.

The constitution of having a coupling part 35 for coupling the rod member 6 to the tube body 3 in a transverse arrangement with respect to the tube body 3 may be applied to a pinch valve which does not have a holding member 20 formed as a single piece but a holding member formed from, for example, two divided halves as well. The rod member 6 may be prism-shaped rather than cylindrical. The rod member 6 may be attached to the front end of the pressing part 4 not by fitting but by fastening or the like.

REFERENCE SIGNS LIST 1. pinch valve
2. valve part
3. tube body
4. pressing part
5. driving part
6. rod member
10. cylinder
11. piston
12. base plate
13. indicator
14. cap
15. O-ring
20. holding member
21. connecting member
22. cap nut
31. tube main body
32. flange part
33. curved part
33a. first curved surface part
33b. second curved surface part
34. edge part
35. coupling part
36. through hole
41. fitting recessed part
42. first recessed part
43. second recessed part
44. latch tab

The invention claimed is:

1. A pinch valve comprising
a tube body made of an elastic material having a flow path formed inside,
a piston,
a pressing part attached to a front end of the piston and configured to rise and fall with the piston,
a single rod member attached to a front end of the pressing part, and
a coupling part provided on the outer surface of the tube body and coupling the rod member to the tube body in a transverse arrangement with respect to the tube body,
wherein pressing or releasing the tube body by the pressing part through the rod member makes the tube body deform and opens or closes the flow path,
wherein the coupling part is provided with a through hole which extends transversely relative to the tube body and through which the rod member can be inserted, and
wherein the rod member is made to a length the same as a width of the tube body after deformation when the pinch valve is fully closed.

2. The pinch valve according to claim 1, wherein the rod member is a cylindrically shaped member, and the front end of the pressing part is provided with a fitting recessed part into which the rod member can be snap fit.

3. The pinch valve according to claim 2, wherein the fitting recessed part is provided with a latch tab which can latch onto the rod member.

* * * * *